Sept. 6, 1932.  E. G. HOLST  1,876,418
DEVICE FOR TEACHING THE PRINCIPLES OF AEROPLANE CONTROLS
Filed Jan. 31, 1931  5 Sheets-Sheet 3
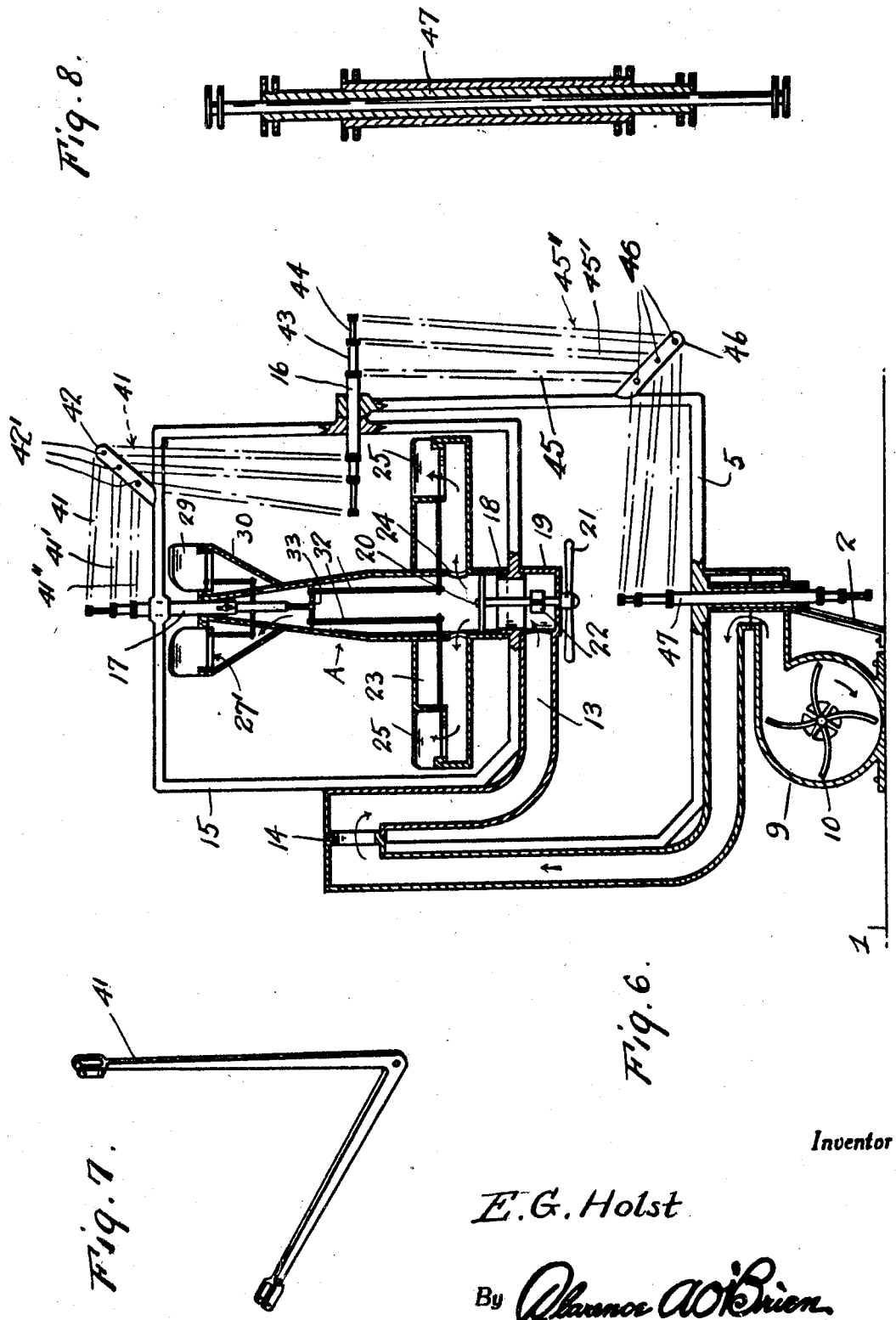
Inventor
E. G. Holst
By Clarence A. O'Brien
Attorney

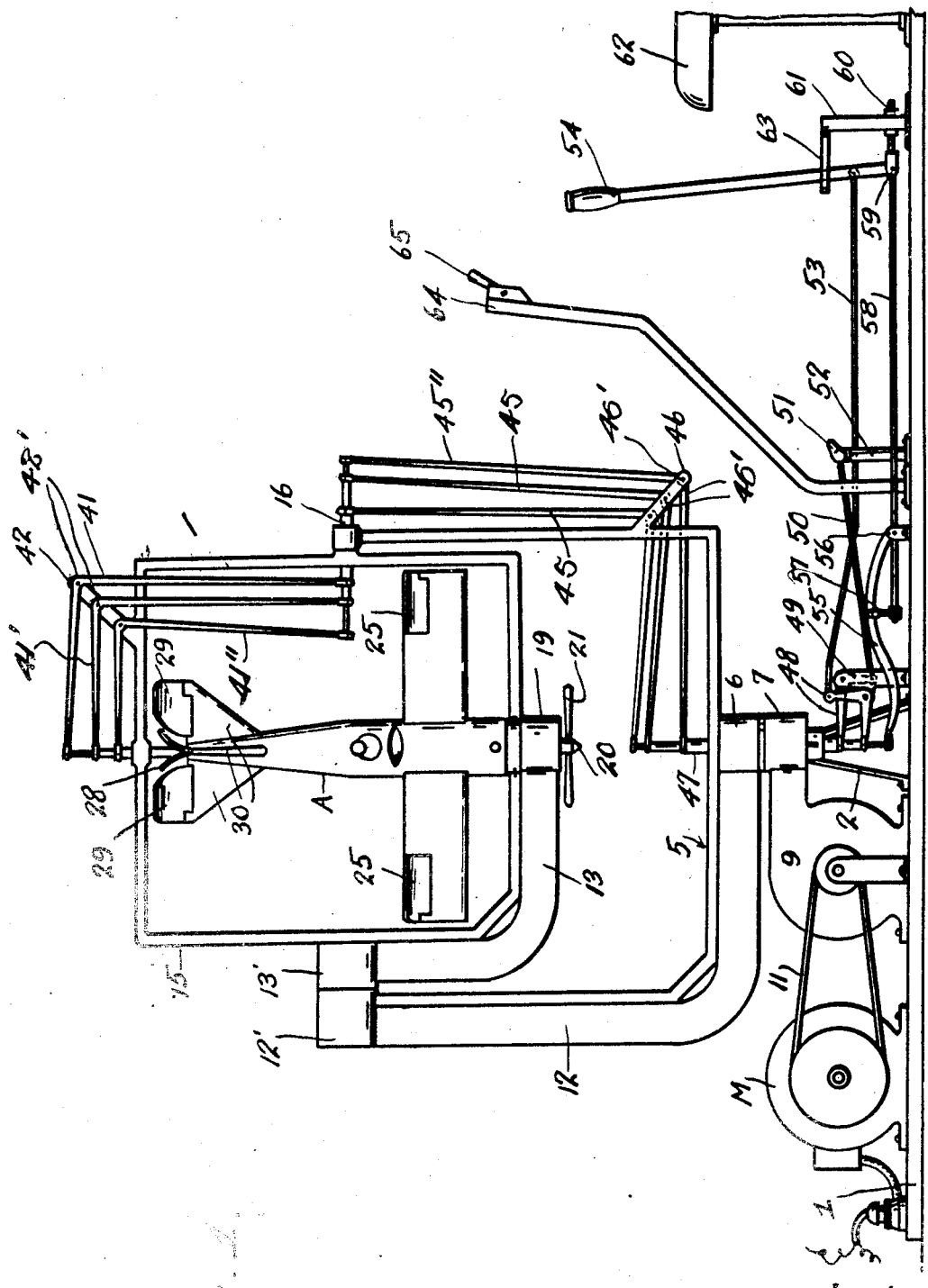

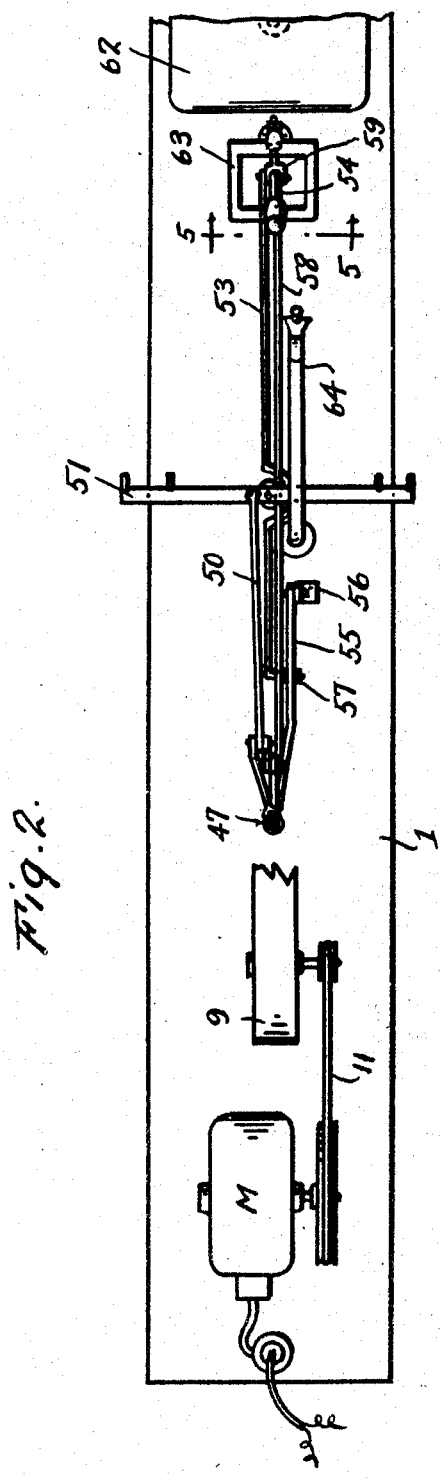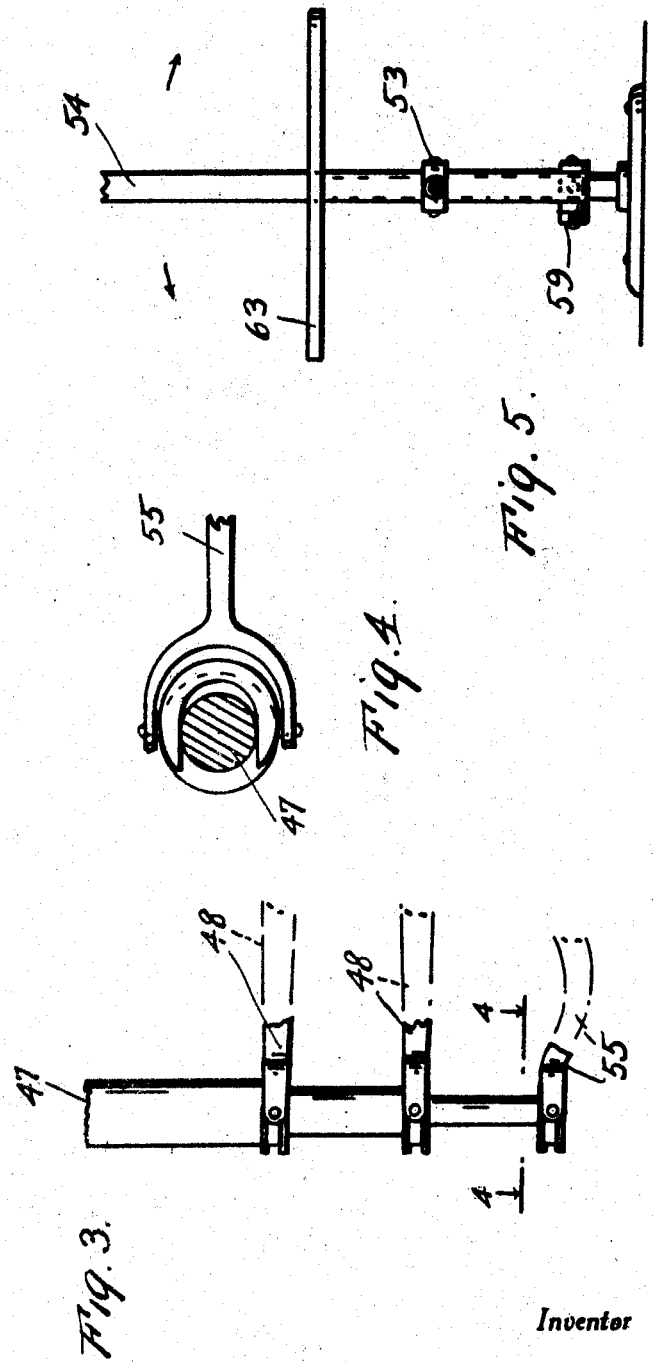

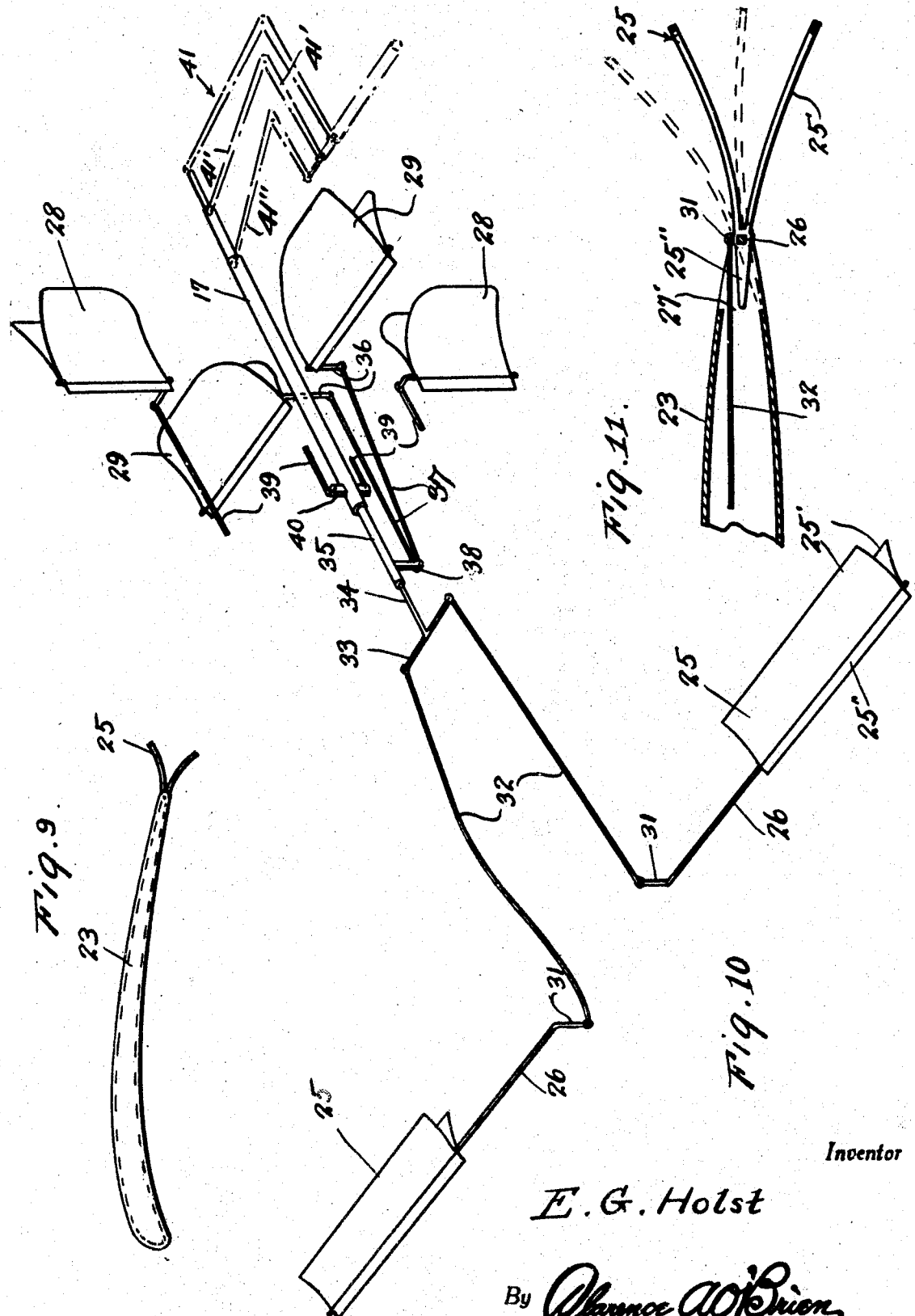

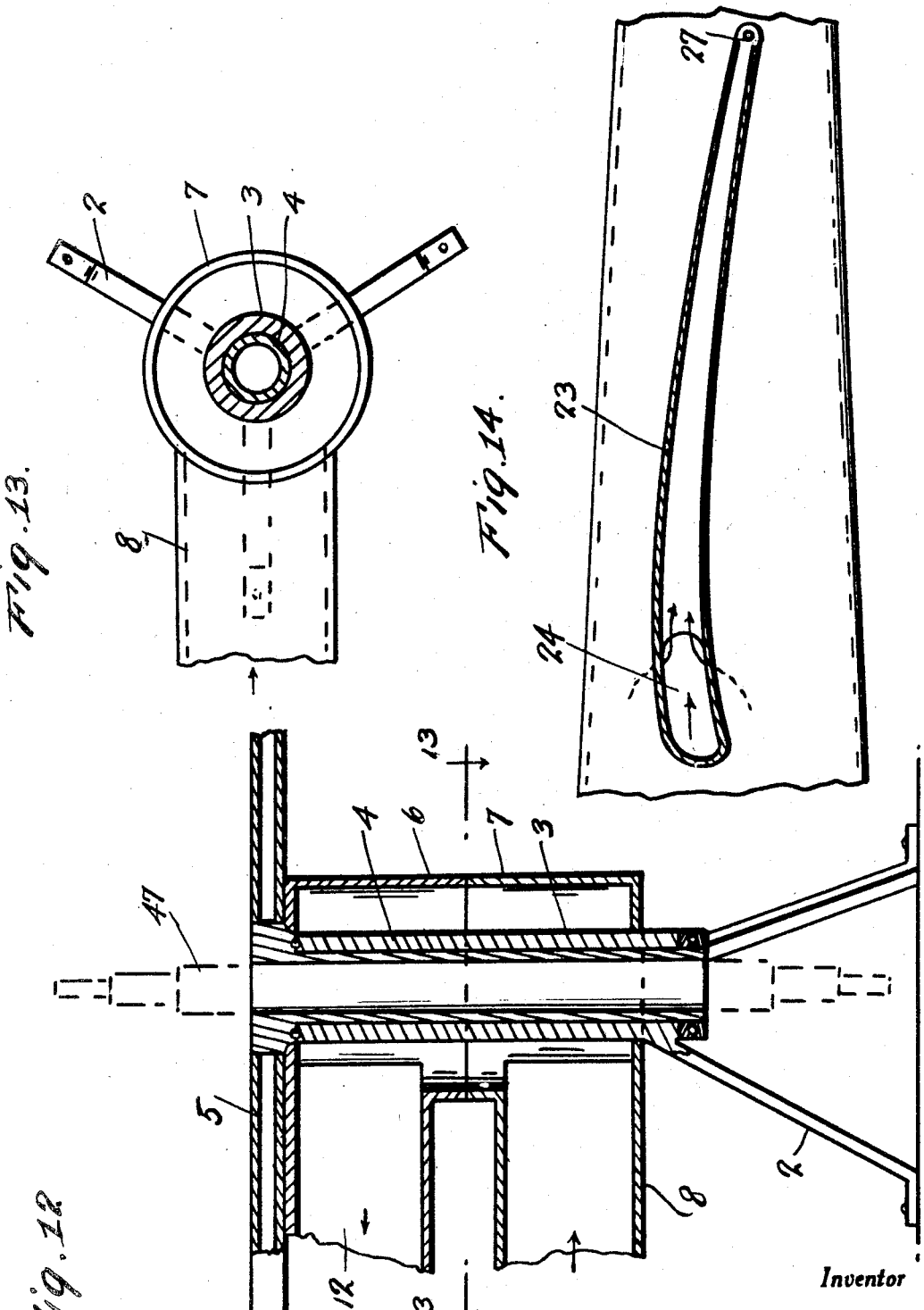

Patented Sept. 6, 1932

1,876,418

UNITED STATES PATENT OFFICE

ELLIS G. HOLST, OF PINEHURST, WASHINGTON

DEVICE FOR TEACHING THE PRINCIPLES OF AEROPLANE CONTROLS

Application filed January 31, 1931. Serial No. 512,698.

This invention relates to a device for teaching one the principles of the controls of an aeroplane, the general object of the invention being to provide a miniature plane supported for rotary movement about its longitudinal axis in a frame which in turn is supported for rotary movement about a horizontal axis in a second frame, and this frame is supported for rotary movement about a vertical axis which is in alinement with the axis of the plane, with means for producing an air current to rotate the propeller of the plane and to act on the ailerons thereof and the rudders and elevators and to provide full size controls which are similar to those in an aeroplane for moving the ailerons and elevators thereof. Thus a person can be readily taught how to operate an aeroplane and the principles involved in aeroplane controls as well as the effects produced in the plane by the various adjustments of the ailerons, rudders, and elevators.

The invention also consists in certain other features of construction and in the combination and arrangement of the several parts, to be hereinafter fully described, illustrated in the accompanying drawings, and specifically pointed out in the appended claims.

In describing the invention in detail, reference will be had to the accompanying drawings wherein like characters denote like or corresponding parts throughout the several views, and in which:

Figure 1 is an elevation of the device.

Figure 2 is a plan view of the apparatus with the frame and the aeroplane removed.

Figure 3 is a fragmentary view showing the lower parts of the telescoping members.

Figure 4 is a section on line 4—4 of Figure 2.

Figure 5 is a section on line 5—5 of Figure 3.

Figure 6 is a sectional view with parts in elevation of the aeroplane and the supporting frame and the fan.

Figure 7 is a view of the bell crank lever.

Figure 8 is a sectional view through the telescoping members.

Figure 9 is an end view of the wing of the plane.

Figure 10 is a diagrammatic view of the controls of the plane and the operating means connected therewith.

Figure 11 is a sectional view through the rear part of the wing and showing an aileron in end view.

Figure 12 is a vertical sectional view through the rotary support for the outer frame and through portions of the air conduits.

Figure 13 is a section on line 13—13 of Figure 12.

Figure 14 is a vertical sectional view through the wing and showing the fuselage in elevation.

The device is shown and described with the frame which carries the aeroplane in vertical position to facilitate the showing and describing of the invention and while the device will operate with the parts in said position the device would most likely be operated with said frame and the aeroplane therein in a horizontal position at the beginning of the operation.

In these drawings, the numeral 1 designates a base and the numeral 2 indicates uprights having their lower ends connected with the base and these uprights support a vertically arranged tubular member 3 which forms a bearing for a hollow shaft 4 which depends from the central part of a substantially U frame 5 which is vertically arranged as shown. A casing 6 surrounds the tubular part 3 and is rotatably arranged thereon and is connected with the top part of the shaft 4 so as to rotate with said shaft. The lower end of the casing is open, and said lower end abuts an aligning casing 7 which has its upper end open so that the two casings form an air space with the upper casing 6 rotatably arranged on the lower casing 7 which is fastened to the tubular part 3. The outlet 8 of a fan casing 9 is connected with the lower casing 7 and the fan 10 of said casing is rotated from an electric motor M through means of the belt and pulleys shown generally at 11, the motor being mounted on the base 1 as is the fan casing 9. A conduit 12 has its lower end connected with the casing 6, said conduit extending along a part of the bottom of the frame 5 and up alongside one side of the frame where it terminates in a tubular part 12′ at top of said side of the frame. A second conduit 13 has its upper end formed with a tubular part 13′ which is rotatably connected with the tubular part 12′ as shown at 14. This part 13′ of the conduit 13 forms a trunnion for a frame 15 of rectangular shape and a trunnion 16 is connected to the opposite side of the frame 15 from that to which the tubular part 13′ is connected. The trunnion 16 has a bearing in the top part of the other side of the frame 5. Thus the frame 5 can rotate about a vertical axis and the frame 15 about a horizontal axis. The conduit 13 is connected with a part of the frame 15. A miniature aeroplane A is rotatably arranged in the frame 15 and said plane has its tail end rotatably mounted on a trunnion member 17 which passes through the central part of the rear part of the frame 15 and a part of the fuselage is rotatably mounted on a bushing or bearing part 18 arranged on the central part of the front portion of the frame 15. A small casing 19 forms the front end of the fuselage and is connected to the outer face of the central part of the front portion of the frame 15 and the conduit 13 is connected to said casing. A propeller shaft 20 is journaled in the front end of the fuselage and passing through the casing 19 and has the propeller 21 on its outer end. Fan blades 22 are fastened to the shaft within the casing 19 so that they will be acted on by the air current flowing into the casing from the conduit 13 and thus the propeller will be rotated by said air current. The fuselage and wing sections 23 are of hollow construction with the sections in communication with the fuselage through the openings 24 so that the air current from the conduit 13 will enter the fuselage and pass to the wing sections. Each wing section is provided with an aileron 25 and each aileron is formed of the members 25′ which are slightly curved and diverge from each other, these parts 25′ being connected to a front part 25″ which is rigidly supported adjacent its rear end on a rod 26 which is supported for rocking movement in the wing section and in part of the fuselage. The front part of each aileron is located in an opening 27 formed in the rear of each wing section and through which the air current passes to engage the parts 25′ of the aileron.

The two rudders 28 and the two elevators 29 are made in substantially the same manner as the aileron and each rudder and each elevator has its front end placed in an opening 27′ formed in the rear part of each of a number of passage forming parts 30 formed in the tail end of the fuselage and in communication with the body thereof so that the air passing through the fuselage will enter the parts 30 and pass through the openings 27′ therein and thus act against the rudders and elevators. These parts 30 simulate the stabilizers of a regular plane.

The inner end of each of the rods 26 with which the ailerons are fastened are formed with the oppositely bent ends 31 and links 32 connect the bent ends with a cross piece 33 fastened to a rod 34 which slidably passes through a tube 35 which, in turn, slides through the trunnion member 17 which is slidably supported in the top part of the frame 15. The rods 26′ which are connected to the rudders and elevators are each also formed with an arm 36 and the arms of the elevators 29 are connected by the links 37 with a projection 38 on the inner end of the tube 35. The rudders 28 are connected by the links 39 with projections 40 on the end of the member 17. Three bell cranks 41, 41′, 41″ are pivoted to a bracket 42 on the top of the frame 15, and the bell cranks are connected respectively to the outer or upper ends of the parts 34, 35, and 17 so that by rocking these bell cranks, the rudders, elevators, and ailerons can be operated. The trunnion member 16 is also slidably arranged in the frame 15 and a tube 43 is slidably arranged in said member 16 and a rod 44 is slidably arranged in the tube. The opposite ends of the bell cranks 41, 41′, 41″ are connected respectively with the inner ends of these members 16, 43, and 44 and other bell cranks 45, 45′, 45″ pivoted to a bracket 46, as shown at 46′ are connected respectively with the outer ends of these parts 16, 43, and 44.

Three sliding members 47 are carried by the hollow shaft 4, the upper ends thereof being connected with the bell cranks 45, 45′ and 45″ respectively and the lower ends of the central and outer members 47 are engaged by the bell cranks 48 which are pivoted to a bracket 49 on the base 1. The bell crank 48 which connected to the central member 47 is connected by a link 50 with a foot lever 51, pivoted intermediate its ends to an upright 52 on the base, the link 50 being connected with the lever on one side of the pivotal point thereof as shown in Figure 2. The other bell crank 48 is connected by a link 53 to the control stick 54. The lower end of the inner member 47 is engaged by a curved lever 55 which is pivoted to a bracket 56 on the base and the crank 57 engages the intermediate part of the lever 55, the crank being connected to one end of a rod 58, the other end of the rod being connected to a clevis 59 carried by a rod 60 which is slidably arranged in a bracket 61 on the base. The lower end of the control stick 54 is connected with the clevis 59 so that by moving the control stick 54 laterally clevis 59 and the rod 58 will be rocked to raise and lower the lever 55 and thus impart longitudinal movement to the inner member 47. The link 53 is connected with the control stick above the clevis so that movement of the control stick in a direction lengthwise of the base will move the link so that the bell crank 28 will move the central member of the member 47 longitudinally.

The outer member of the group 47 is moved longitudinally by a rocking movement imparted to the foot lever by means of the operator's foot.

The bracket 61 carries the part 63 for limiting the lateral rocking movement of the control stick. An upright 64 is fastened to the base and carries a switch 65 at its upper end and is accessible to one sitting in the seat 62 and this switch controls the circuit to the motor M.

From the foregoing it will be seen that the operator sitting in the seat 62 can adjust the ailerons, elevators, and rudders, through means of the control stick 54 and the foot lever 51 and the connections as well as the sliding members to which the bell cranks are connected and the movement given to the control stick and the foot lever are the same that an operator of a full sized airplane would use in controlling the parts of the plane.

It will also be seen that the air blast from the fan will pass through the conduits 12 and 13 and into the fuselage of the miniature plane so as to operate the propeller shaft and then the air current will pass through the openings in the tail end of the plane. If the aileron, rudders, and elevators are in a central position as shown in Figures 9 and 11, the air current passing through the openings will have no effect on the control element. If any one of the elements is tilted, as shown in dotted lines in Figure 11, the air current will act on the element.

If the ailerons are adjusted, the plane will turn on its axis just the same as a real plane when its ailerons are adjusted. If the elevators are adjusted, the air current acting on said elevators would cause the frame 15 to move on a horizontal axis just the same as a real plane would move when its elevators are adjusted. When the rudders are adjusted the air current acting on the rudders would cause the frame 5 to rotate on its vertical axis so that the resultant movement of said miniature plane would simulate the movement of a real plane when its rudder is adjusted. Thus this invention will readily teach one how to operate the controls of a plane and the results which occur when the ailerons, elevators, and rudders are actuated as in a real plane.

It is thought from the foregoing description that the advantages and novel features of the invention will be readily apparent.

It is to be understood that changes may be made in the construction and in the combination and the arrangement of the several parts, provided that such changes fall within the scope of the appended claims.

Having thus described my invention, what I claim as new is:

1. An apparatus of the class described comprising a base, a frame supported for movement about a vertical axis on the base, a second frame supported in the first frame for movement about a horizontal axis, a miniature aeroplane supported in the second frame and for movement about its longitudinal axis, means for introducing an air current into the fuselage and wing of the plane, said wing and the tail end of the fuselage having openings therein, ailerons adjustably supported adjacent the openings in the wing, rudders and elevators adjustably supported adjacent the openings in the tail end of the fuselage, manually operated means for adjusting the ailerons, manually operated means for adjusting the elevators, manually operated means for adjusting the rudders, whereby the air current will act on said control elements, the action of the air on the ailerons causing the plane to move about its axis, the action of the air on the elevators causing the second frame to move on its axis and the action of the air on the rudders causing the first frame to move on its axis.

2. An apparatus of the class described comprising a base, a frame supported for movement about a vertical axis on the base, a second frame supported in the first frame for movement about a horizontal axis, a miniature aeroplane supported in the second frame and for movement about its longitudinal axis, means for introducing an air current into the fuselage and wing of the plane, said wing and the tail end of the fuselage having openings therein, ailerons adjustably supported adjacent the openings in the wing, rudders and elevators adjustably supported adjacent the openings in the tail end of the fuselage, manually operated means for adjusting the ailerons, manually operated means for adjusting the elevators, manually operated means for adjusting the rudders, whereby the air current will act on said control elements, the action of the air on the ailerons causing the plane to move about its axis, the action of the air on the elevators causing the second frame to move on its axis and the action of the air on the rudders causing the first frame to move on its axis, each of said control elements comprising a pair of diverging members and means whereby when the elements are in a neutral position the air current will be neutralized by engaging both of the members but when the element is moved to either one side or the other of the neutral position, the air current will act on said element.

3. A device of the class described comprising a frame vertically arranged and supported for movement about a vertical axis, a second frame supported in the first frame for movement about a horizontal axis, a miniature aeroplane arranged in the second frame and supported for movement about its longitudinal axis, means for introducing an air current into the fuselage and wings of the plane, said wing and the tail end of the fuselage having openings therein for the escape of the air, ailerons arranged adjacent the openings in the wings, rudders and elevators arranged adjacent the openings in the tail, whereby the air escaping through the openings will act on said elements, a control stick supported for movement backwardly and forwardly and laterally or at right angles to the plane of the backward and forward movement; means operated by the control stick when the same is moved laterally for adjusting the ailerons, means operated by said control stick when the same is moved forwardly or backwardly for moving the elevators, a foot lever, means operated thereby for operating the rudders.

4. A device for the class described comprising a frame vertically arranged and supported for movement about a vertical axis, a second frame supported in the first frame for movement about a horizontal axis, a miniature aeroplane arranged in the second frame and supported for movement about its longitudinal axis, means for introducing an air current into the fuselage and wing of the plane, said wing and the tail end of the fuselage having openings therein for the escape of the air, ailerons arranged adjacent the openings in the wing, rudders and elevators arranged adjacent the openings in the tail, whereby the air escaping through the openings will act on said elements, a control stick supported for movement in a forward and backward direction as well as in a direction at right angles to the plane of the forward and backward movement, means operated by the control stick when the same is moved laterally for adjusting the ailerons, means operated by said control stick when the same is moved forwardly and backwardly for moving the elevators, a foot lever, means operated thereby for operating the rudders, a propeller shaft journaled in the front end of the fuselage of the plane, a propeller on said shaft, a fan on the shaft acted on by the air current for rotating the shaft and propeller.

5. An apparatus of the class described comprising a base, a tubular bearing member supported on the base and vertically arranged, a tubular shaft rotatably arranged in the bearing member, a vertically arranged frame having the central part of its lower portion fastened to the upper end of the shaft, a sectional casing arranged on the tubular member, the upper section being connected with the tubular shaft and the lower section being connected with the tubular member, a fan for introducing an air blast into the lower section, a motor for driving the fan, a conduit connected with the frame having one end connected with the upper section of the casing, a second frame, a conduit thereon, tubular abutting parts at adjacent ends of the conduits, means for rotatably connecting one tubular part to the other, a miniature aeroplane carried by the second frame and supported for rotary movement about its longitudinal axis, the fuselage and wing of the plane being hollow and the second conduit being connected with the fuselage, said wing and the tail end of the fuselage having openings therein for escape of the air, control elements adjustably supported adjacent the openings whereby the air current will act on such elements, a control stick movably arranged on the base, means whereby the movement of said stick will operate two sets of the control elements, a foot lever, means whereby movement of the foot lever will control another set of elements, a seat on the base, and an upright adjacent the seat and carrying the switch for controlling the motor.

In testimony whereof I affix my signature.

ELLIS G. HOLST.